(12) United States Patent
Nishita

(10) Patent No.: US 6,783,283 B2
(45) Date of Patent: Aug. 31, 2004

(54) OPTICAL CONNECTOR FOR COUPLING OPTICAL SIGNALS TO OPTICAL DEVICES

(75) Inventor: Naoki Nishita, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/105,094

(22) Filed: Mar. 22, 2002

(65) Prior Publication Data

US 2002/0160656 A1 Oct. 31, 2002

(30) Foreign Application Priority Data

Apr. 27, 2001 (JP) .................................... 2001-132385

(51) Int. Cl.⁷ .............................................. G02B 6/36
(52) U.S. Cl. .......................... 385/92; 385/39; 385/53; 385/88; 385/89; 385/90; 385/91; 385/93
(58) Field of Search ..................... 385/39, 53, 88–93

(56) References Cited

U.S. PATENT DOCUMENTS

| | | | | |
|---|---|---|---|---|
| 5,127,075 A | * | 6/1992 | Althaus et al. | 385/94 |
| 5,305,408 A | | 4/1994 | Schaffer et al. | 385/92 |
| 5,463,707 A | * | 10/1995 | Nakata et al. | 385/35 |
| RE36,886 E | * | 10/2000 | Ishibashi et al. | 385/92 |
| 6,374,021 B1 | * | 4/2002 | Nakanishi et al. | 385/49 |
| 6,480,639 B2 | * | 11/2002 | Hashimoto et al. | 385/14 |
| 6,712,527 B1 | * | 3/2004 | Chan et al. | 385/88 |
| 2002/0136506 A1 | * | 9/2002 | Asada et al. | 385/92 |

FOREIGN PATENT DOCUMENTS

JP      2000-193849      7/2000      ............ G02B/6/36

* cited by examiner

Primary Examiner—Akm Enayet Ullah
Assistant Examiner—Daniel Petkovsek
(74) Attorney, Agent, or Firm—Knobbe, Martens, Olson & Bear LLP

(57) ABSTRACT

A connector of the invention is a connector capable of suppressing electrical crosstalk between optical devices, preferably performing the optical coupling of the optical devices and the electrical coupling by electric terminals. A first connector housing formed of a conductive resin is disposed with a first optical device accommodating part for accommodating a light receiving device. A second connector housing formed of a non-conductive resin is disposed with a second optical device accommodating part for accommodating a light emitting device and electric terminals. The coupling end faces of optical fibers are fixed to a plug connector and the plug connector is inserted into a plug connector fitting part. This insertion allows optical coupling of the optical fibers to the light emitting device and the light receiving device, and it allows electrical coupling of the above electric terminals to wires fixed to the plug connector. The first and second optical device accommodating parts are arranged so that their positions are displaced in the longitudinal direction of the optical fibers, whereby the electrical crosstalk between the light receiving device and the light emitting device is suppressed.

10 Claims, 4 Drawing Sheets

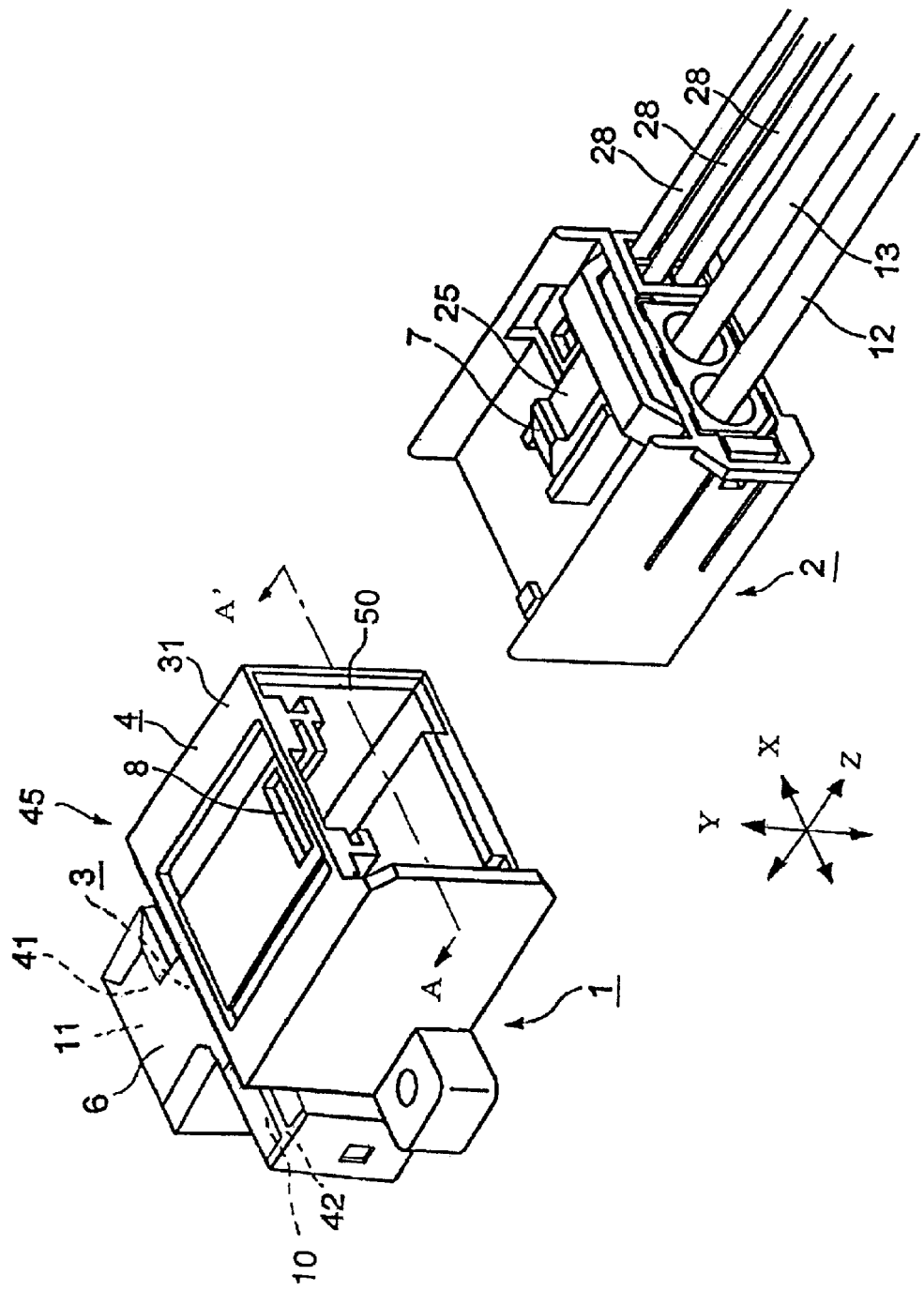

US 6,783,283 B2

OPTICAL CONNECTOR FOR COUPLING OPTICAL SIGNALS TO OPTICAL DEVICES

FIELD OF THE INVENTION

The present invention relates to a connector such as a hybrid optical/electrical connector or optical connector mounted and disposed in a vehicle for use in optical communications inside the vehicle.

BACKGROUND OF THE INVENTION

Recently, the computerization of vehicles has been advanced dramatically. For example, it is performed that the location of a vehicle is denoted on a map by using car navigation systems. Additionally, by utilizing the ITS (intelligent transport systems), the management of solving traffic congestion of vehicles is conducted. With such computerization, the throughput of communication information such as data, image and voice inside a vehicle has been increasing.

Then, the optical communications using optical fibers as a high capacity medium for transmitting information has been conducted inside vehicles such as automobiles. The optical communications are conducted in which light emitted from a light emitting device is incident into one end side of an optical fiber to propagate along the optical fiber, and the propagating light is received by a light receiving device disposed on the other end side of the optical fiber. In connecting the optical fiber to an optical device such as the light emitting device or light receiving device, an optical connector is generally used.

Furthermore, a plastic optical fiber is easy to handle because of its diameter being larger than that of a glass optical fiber. On this account, the plastic optical fiber is often adapted for use in the communications inside a vehicle.

SUMMARY OF THE INVENTION

The connector of the invention comprises:
two or more optical device accommodating parts for accommodating optical devices; and
a connector housing provided with an insertion part for optical fibers connected to the optical devices,
wherein among adjacent optical device accommodating parts, at least adjacent optical device accommodating parts are arranged side by side with their positions displaced relative to each other in the longitudinal direction of the optical fibers inserted into the insertion part for optical fibers.

BRIEF DESCRIPTION OF THE DRAWINGS

Exemplary embodiments of the invention will now be described in conjunction with drawings, in which:

FIG. 1 depicts a perspective view illustrating one embodiment of a connector in the invention along with a connection counterpart;

DETAILED DESCRIPTION

Figure 2A:
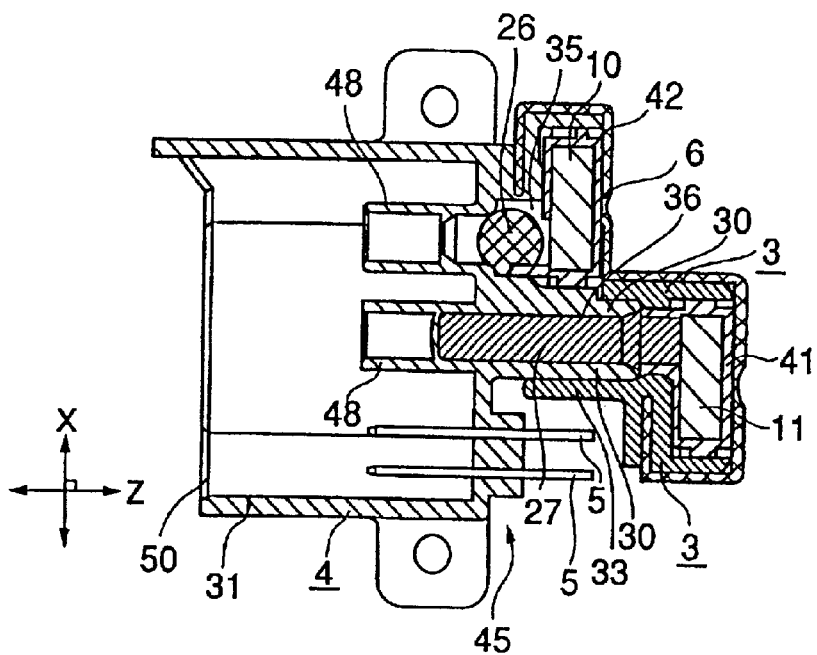
FIG. 2A depicts a cross section of the connector of the embodiment.

Devices performing the optical communications for vehicles are mounted with electric connectors for power supply or electric connectors for telecommunications adapted to low bit-rate information transmission, for example. Therefore, the work to fit these electric connectors to the optical connectors is needed. In order to eliminate the need for this work, the application of a hybrid optical/electric connector having both functions of the optical connector and the electric connector can be considered.

Additionally, to realize saving of space for the devices in the vehicle, it can be considered that there are the needs to provide more than one optical device in one hybrid optical/electric connector and to make the hybrid optical/electric connector small-sized.

However, when two or more optical devices are adjacently disposed inside one hybrid optical/electric connector, crosstalk of electrical noises generated from the optical devices occurs. Then, there is concern that this crosstalk might cause degraded quality in optical communications using optical devices. Particularly, there is fear that quality might be degraded in high bit-rate optical communications. Furthermore, the issue of the electrical crosstalk arises in the optical connector having two or more optical devices as well as in the hybrid optical/electric connector.

Besides, since there are many electromagnetic waves generated from various devices inside a vehicle, the hybrid optical/electric connector needs to have the configuration of shielding optical devices so that the optical devices are prevented from being influenced by noises due to these electromagnetic waves. Then, it can be considered that the hybrid optical/electric connector is formed of a conductive material such as metal. However, when the hybrid optical/electric connector is formed of a conductive material, electric terminals are electrically coupled and they cannot serve the function as connectors.

On this account, it was traditionally hard to realize a small-sized hybrid optical/electric connector having two or more optical devices therein with functions both as the optical connector and the electric connector, which suppresses the electrical crosstalk of optical devices.

In a connector accommodating two or more optical devices therein, one aspect of the connector of the invention is a connector capable of suppressing the electrical crosstalk between optical devices. Additionally, the more preferable aspect of the connector of the invention is a small-sized hybrid optical/electric connector capable of performing both the optical coupling of optical devices and the electrical coupling using electric terminals, in which the optical devices are not easily influenced by noises outside the connector.

Hereafter, an embodiment of the invention will be described with reference to the drawings. FIG. 1 depicts a perspective view of one embodiment of the connector in the invention along with an optical component of a connection counterpart. The connector of the embodiment is a hybrid optical/electric connector 1. FIG. 1 depicts a state where the connector (hybrid optical/electric connector) 1 of the embodiment is placed facing a plug connector 2 which is the optical component to be connected with space between them.

Figure 2B:
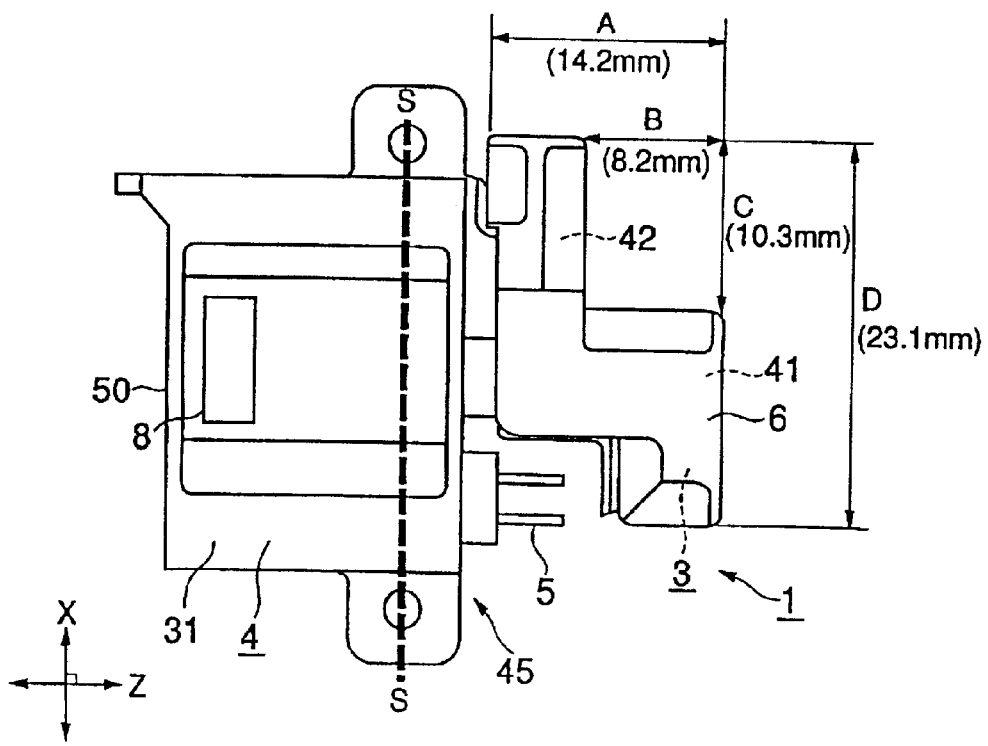
FIG. 2B depicts a plan view of the connector of the embodiment.

Additionally, FIG. 2A depicts a section when the hybrid optical/electric connector 1 is cut at a line A–A' shown in FIG. 1. FIG. 2B depicts a plan view of the hybrid optical/electric connector 1. Furthermore, FIG. 3 depicts an exploded configurational view of the hybrid optical/electric connector 1.

Figure 3:
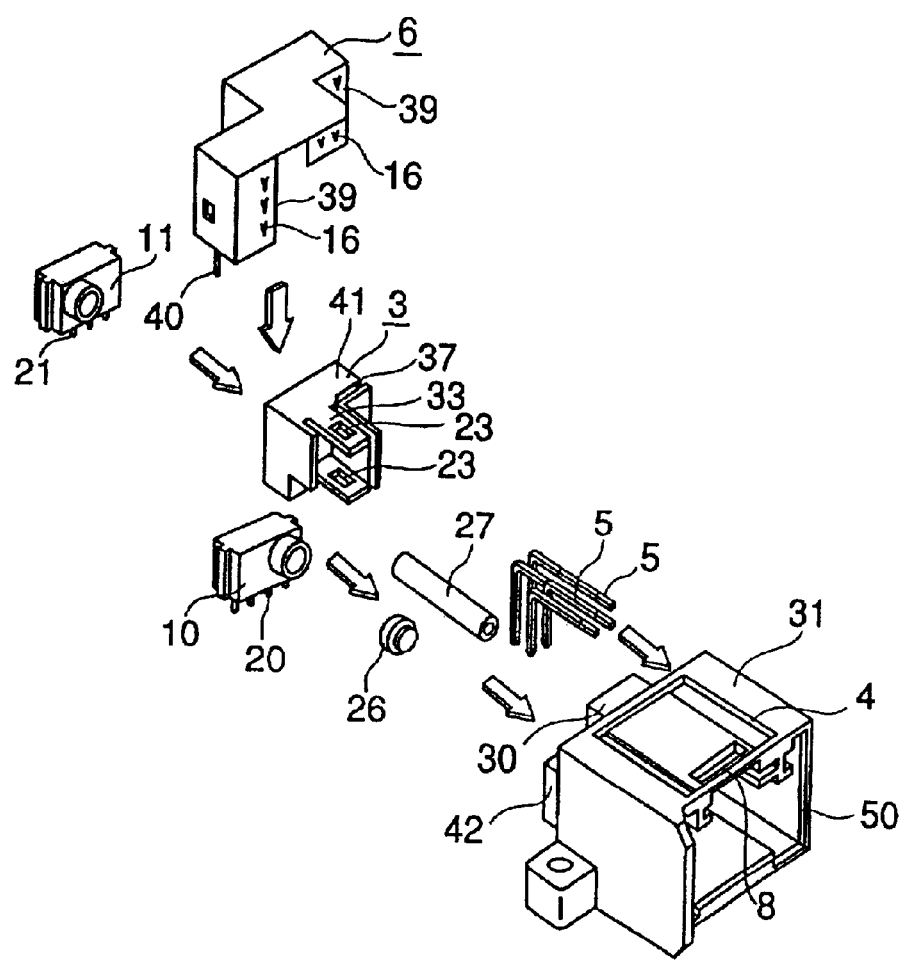
FIG. 3 depicts an illustration showing the configuration of the connector of the embodiment in an exploded state.

As shown in FIGS. 1 to 3, the hybrid optical/electric connector 1 has a connector housing 45. The connector housing 45 has two or more optical device accommodating parts 41 and 42 (here, they are two) for accommodating optical devices. The connector housing 45 is provided with an insertion part (optical fiber insertion part) for optical fibers to be connected to the optical devices.

The connector housing 45 has a box-shaped plug connector fitting part 31 where the front end is formed to be an opening 50. The plug connector fitting part 31 has the configuration for inserting and fitting the plug connector 2. The plug connector 2 is inserted and fixed with optical fibers 12 and 13, and the plug connector fitting part 31 functions as the insertion part for the optical fibers 12 and 13. The optical fibers 12 and 13 are connected to the optical devices accommodated in the optical device accommodating parts 41 and 42, respectively.

One of the characteristic configurations of the connector (hybrid optical/electric connector 1) of the embodiment is where the optical device accommodating parts are adjacent to each other, that is, the first optical device accommodating part 41 and the second the optical device accommodating parts 42 are arranged side by side as their positions are displaced relative to each other in the longitudinal direction (the Z-direction in FIGS. 1, 2A and 2B) of the optical fibers 12 and 13 to be inserted into the plug connector fitting part 31.

The first optical device accommodating part 41 has a photodiode (PD), which is a light receiving device 11, accommodated therein. The second optical device accommodating part 42 has a light emitting diode (LED), which is a light emitting device 10, accommodated therein. The connector housing 45 has a first connector housing 3 having the first optical device accommodating part 41 and a second connector housing 4 disposed in the front side of the first connector housing 3. As shown in FIG. 3, the second connector housing 4 is disposed with electric terminals 5, and it is formed with the second optical device accommodating part 42.

The first connector housing 3 is formed of PBT (polybutylene terephthalate) with carbon filler, which is a conductive resin. The second connector housing 4 is formed of PBT with glass filler, which is a non-conductive resin. The non-conductive resin forming the second connector housing 4 is made by mixing 15% of the glass filler by weight, for example.

As shown in FIG. 2A, the first connector housing 3 is disposed on one end side of the second connector housing 4, and the first connector housing 3 and the second connector housing 4 are formed to be freely detached and attached. Additionally, as shown in FIG. 3, the second connector housing 4 is formed with a joining part 30 to the first connector housing 3 on the other side of the opening 50. The first connector housing 3 has a joining part 33 to the second connector housing 4. The joining part 33 is fit so as to cover the joining part 30 of the second connector housing 4, thus fitting the first connector housing 3 into the second connector housing 4.

Figure 5:
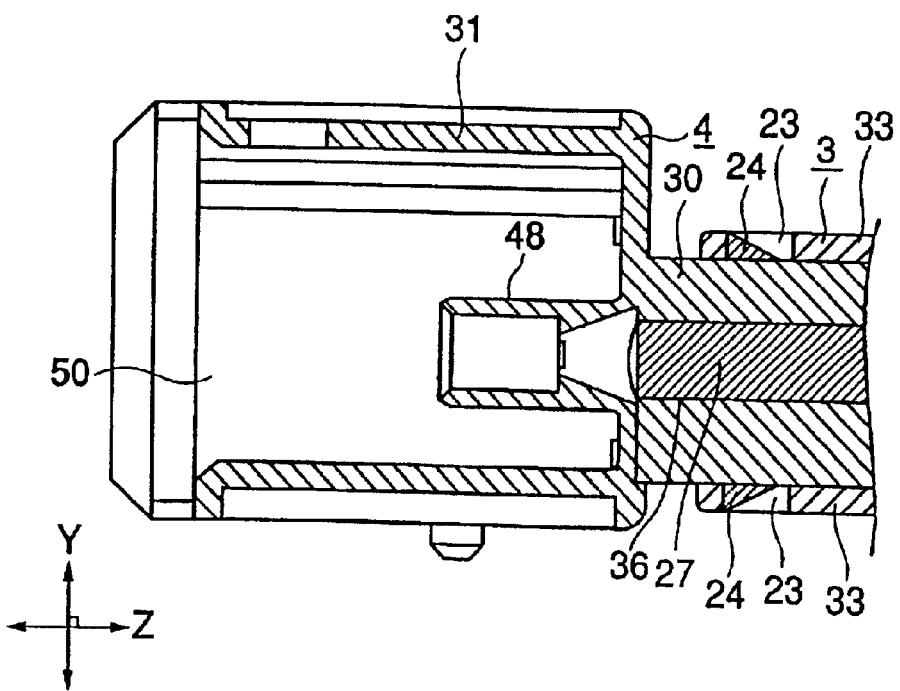
FIG. 5 depicts a sectional illustration showing the structure of joining parts of a first connector housing to a second connector housing disposed in the embodiment.

The joining part 33 is formed with a pair of upper and lower pawl fitting holes 23. As shown in FIG. 5, a pair of upper and lower pawl parts 24 disposed on the joining part 30 of the second connector housing 4 is fit into the upper and lower pawl fitting parts 23, respectively, thereby fixing the first connector housing 3 to the second connector housing 4. Furthermore, when the pawl parts 24 are removed from the pawl fitting parts 23, this releases the connection of the first connector housing 3 to the second connector housing 4.

As shown in FIG. 3, the light emitting device 10 is arranged as facing the light emitting face (light emitting part) thereof to the plug connector fitting part 31 side. The light receiving device 11 is arranged so that its light receiving face (light receiving part) faces the plug connector fitting part 31 side. Additionally, 20 and 21 denote terminals of the light emitting device 10 and the light receiving device 11 in FIG. 3.

Furthermore, the embodiment is provided with a metal case 6 for fixing the optical devices (the light receiving device 11 and the light emitting device 10) accommodated in the first and second optical device accommodating parts 41 and 42. The metal case 6 is disposed so as to cover the first and second optical device accommodating parts 41 and 42. The metal case 6 is formed with a terminal part 40 for ground.

The metal case 6 is formed by bending a metal plate of brass, for example. As shown in FIG. 3, the surface of walls 39 of the metal case 6 is disposed with a plurality of bumps 16. The metal case 6 is mounted on the first connector housing 3 and the second optical device accommodating part 42 of the second connector housing 4 from the upper side of the first connector housing 3. The walls 39 of the metal case 6 are inserted into a groove 37 of the first connector housing 3 and a groove (not shown) of the second connector housing 4.

Then, it is configured that the bumps 16 bite the first connector housing 3 and the metal case 6 is conducted to the first connector housing 3. The surface of the metal case 6 is applied with plating such as tin, nickel, gold, and solder for corrosion protection.

Figure 4:
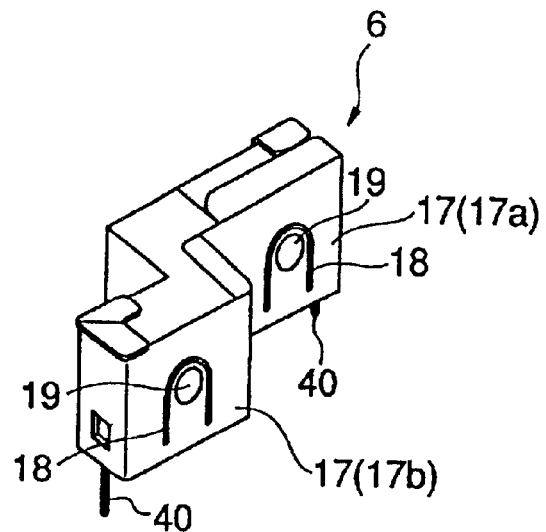
FIG. 4 depicts an illustration of a metal case disposed in the embodiment.

FIG. 4 is a diagram of the metal case 6 viewed from faces 17 (17a and 17b) on the optical device fixing side. The faces 17 (17a and 17b) are formed with spring mechanisms for pressing on both the light emitting device 10 and the light receiving device 11 to the plug connector fitting part 31 side, as described below. In the embodiment, the spring mechanism is that U-shaped slits 18 are formed in the faces 17 (17a and 17b) on the optical device fixing side and projecting parts 19 projecting from the faces abutting against the light emitting device 10 and the light receiving device 11 is formed.

The spring mechanisms absorb the errors of sizes between the light receiving device 11 and the first optical device accommodating part 41 and between the light emitting device 10 and the second optical device accommodating part 42 by the pressing force. According to the error absorption, the spring mechanisms have the function of accurately fixing the light receiving device 11 and the light emitting device 10 to the corresponding first optical device accommodating part 41 and second optical device accommodating part 42, respectively.

As shown in FIG. 1, the plug connector 2, which is connected to the hybrid optical/electric connector 1, is formed to have the optical fibers 12 and 13 arranged side by side. The optical fiber 12 is optically coupled to the light emitting device 10 and the optical fiber 13 is optically coupled to the light receiving device 11. The coupling end face side of the optical fibers 12 and 13 is fixed to a ferrule (not shown) inserted and fixed to the plug connector 2. The optical fibers 12 and 13 are multimode optical fibers, which are formed of a plastic optical fiber having a diameter of one millimeter.

The plug connector 2 is disposed with a lock arm 25 on the upper face side. A locking pawl 7 disposed on the tip end side of the lock arm 25 is locked into a pawl locking part 8 of the hybrid optical/electric connector 1, whereby the plug connector 2 is fixed to the hybrid optical/electric connector 1. It is configured that the locking pawl 7 can be removed from the pawl locking part 8, thereby releasing the connection of the plug connector 2 to the hybrid optical/electric connector 1.

As shown in FIG. 2A, in the second connector housing 4 of the hybrid optical/electric connector 1, the joining part 30 is disposed with a through hole part 36. Additionally, the second connector housing 4 is disposed with a through hole part 35 for allowing communication between the second optical device accommodating part 42 and the plug connector fitting part 31. These hole parts 35 and 36 are faced opposite to the light emitting device 10 and the light receiving device 11, respectively. The hole part 35 on the light emitting device 10 side is disposed with a lens 26, and the hole part 36 on the light receiving device 11 side is disposed with an optical coupling intermediate optical fiber 27.

The optical coupling intermediate optical fiber 27 is an optical fiber that mediates the coupling of the optical fiber 13 inserted into the plug connector fitting part 31 to the light receiving device 11. The lens 26 is a lens that allows the light emitted from the light emitting device 10 to enter with an incident numerical aperture smaller than that of the optical fiber 12 inserted into the plug connector fitting part 31.

The light emitting device 10 has a radiant numerical aperture (0.87, for example) greater than a numerical aperture (0.5, for example) of the optical fiber 12. The lens 26 has the function of allowing the light emitted from the light emitting device 10 to enter the optical fiber 12 so that the light is to have an incident numerical aperture (0.25, here) smaller than the numerical aperture of the optical fiber 12.

Additionally, the lens 26 is formed with a rim around the periphery thereof. This rim is formed with projections and notches, not shown, to prevent the lens from being installed with the wrong side forward. The lens 26 is an inexpensive lens formed of a transparent resin.

Inside the plug connector fitting part 31 of the second connector housing 4, a pair of cylindrical sleeves 48 is arranged side by side as projecting toward the opening 50. The sleeves 48 are configured to lead the ferrule disposed in the plug connector 2. Furthermore, the coupling end faces of the optical fibers 12 and 13 fixed to the ferrule are disposed at positions recessed more than the coupling end face of the plug connector 2 for protection.

The first and second optical device accommodating parts 41 and 42 are arranged side by side with their positions displaced relative to each other in the longitudinal direction of the optical fibers 12 and 13. However, according to the configuration of the hole parts 35 and 36, the coupling face of the light emitting device 10 to the optical fiber 12 and the coupling face of the light receiving device 11 to the optical fiber 13 are in the same plane as indicated by a line S—S shown in FIG. 2B.

Moreover, in the hybrid optical/electric connector 1 of the embodiment, a length A shown in FIG. 2B is 14.2 mm, a length B is 8.2 mm, a length C is 10.3 mm, and a length D is 23.1 mm.

As shown in FIG. 1, the plug connector 2 is inserted and fixed with four wires 28. When the plug connector 2 is inserted and fit into the second connector housing 4, these wires 28 are connected to the electric terminals 5. The embodiment is configured as described above. In fabricating the connector of the embodiment, the first connector housing 3 and the second connector housing 4, separately formed, and the metal case 6 are prepared, and further the electric terminals 5, the lens 26, the optical coupling intermediate optical fiber 27, the light emitting device 10, and the light receiving device 11 are prepared, as shown in FIG. 3.

Then, as shown in the same drawing, the electric terminals 5 are mounted in the second connector housing 4, and the lens 26 and the optical coupling intermediate optical fiber 27 are inserted and fixed into the hole parts 35 and 36 of the second connector housing 4, respectively. Additionally, the light receiving device 11 is inserted into the first optical device accommodating part 41 of the first connector housing 3, and the first connector housing 3 is mounted in the second connector housing 4. The light emitting device 10 is inserted into the second optical device accommodating part 42 of the second connector housing 4.

Subsequently, the metal case 6 is mounted on the first and second optical device accommodating parts 41 and 42, the light receiving device 11 is fixed to the first optical device accommodating part 41, and the light emitting device 10 is fixed to the second optical device accommodating part 42.

Furthermore, as shown in FIG. 1, when the plug connector 2 is inserted into the plug connector fitting part 31 of the hybrid optical/electric connector 1 of the embodiment, the following optical coupling is performed. The optical fiber 12 fixed to the plug connector 2 is optically coupled to the light emitting device 10 through the lens 26 fixed to the hybrid optical/electric connector 1. Moreover, the optical fiber 13 fixed to the plug connector 2 is optically coupled to the light receiving device 11 through the optical coupling intermediate optical fiber 27 fixed to the hybrid optical/electric connector 1.

Further, by inserting the plug connector 2 into the hybrid optical/electric connector 1, the wires 28 fixed to the plug connector 2 are electrically coupled to the electric terminals 5 disposed in the hybrid optical/electric connector 1.

As described above, the hybrid optical/electric connector 1 of the embodiment can perform both the optical coupling of the optical devices (the light emitting device 10 and the light receiving device 11) and the electric coupling using the electric terminals 5 extremely easily and precisely.

Additionally, in the hybrid optical/electric connector 1 of the embodiment, the first and second optical device accommodating parts 41 and 42 are arranged side by side with their positions displaced relative to each other in the longitudinal direction of the optical fibers 12 and 13. On this account, the hybrid optical/electric connector 1 prevents the optical devices accommodated in the adjacent first and second optical device (the light emitting device 10 and the light receiving device 11) from electrically interfering with each other, and it can suppress the electrical crosstalk between the optical devices.

Furthermore, in the hybrid optical/electric connector 1 of the embodiment, the first optical device accommodating part 41 is disposed at a position extended more to the rear than the portion where the electric terminals 5 are placed, the first optical device accommodating part 41 being adjacent to the portion where the electric terminals 5 are placed. On this account, the dimensions of the hybrid optical/electric connector 1 in the width direction (the X-direction shown in FIG. 2A and the direction in which the optical device accommodating parts 41 and 42 are lined up) can be suppressed, and interference between the light receiving device 11 and the electric terminals 5 can be avoided.

Moreover, in the hybrid optical/electric connector 1 of the embodiment, the second optical device accommodating part 42 adjacent to the first optical device accommodating part 41 is disposed at a position more forward than the first optical device accommodating part 41. On this account, in the hybrid optical/electric connector 1, a smaller-sized hybrid optical/electric connector 1 can be designed than in the case where the second optical device accommodating part 42 is disposed more to the rear than the first optical device accommodating part 41, or the case where they are disposed at the same position in the Z-direction.

That is, in the hybrid optical/electric connector 1 of the embodiment, the effective area of a substrate (circuit bard) to mount the hybrid optical/electric connector 1 thereon can be expanded by an area of C times B (10.3 mm×8.2 mm) as compared with the case where the first optical device accommodating part 41 and the second optical device accommodating part 42 are arranged side by side at the same positions in the Z-direction, for example. Accordingly, the hybrid optical/electric connector 1 of the embodiment can utilize the substrate space effectively.

Besides, in the hybrid optical/electric connector 1 of the embodiment, both the first optical device accommodating part 41 for accommodating the light receiving device 11 and the second optical device accommodating part 42 for accommodating the light emitting device 10 are covered with the metal case 6. Thus, the hybrid optical/electric connector 1 of the embodiment can electrically shield the light receiving device 11 and the light emitting device 10, and it can prevent the influence of noises due to electromagnetic waves.

Additionally, in the hybrid optical/electric connector 1 of the embodiment, the first connector housing 3 is formed of a conductive resin, which accommodates the light receiving device 11 particularly subject to noises due to electromagnetic waves more than the light emitting device 10 between the light receiving device 11 and the light emitting device 10. In this manner, the configuration of shielding the optical device with both the first connector housing 3 of a conductive resin and the metal case 6 can enhance the shielding effect higher than shielding the optical device only with a single metal case.

Therefore, the hybrid optical/electric connector 1 of the embodiment can suppress the light receiving device 11 side from being subject to noises due to outside electromagnetic waves further surely. Besides, the inventor reveals the higher shielding effect of shielding the optical device with both the conductive resin housing and the metal case by experiment.

Furthermore, the hybrid optical/electric connector 1 of the embodiment has the configuration in which the bumps 16 of the metal case 6 are allowed to bite the first connector housing 3, whereby the metal case 6 is conducted to the first connector housing 3. Thus, conducting the conductive resin and fixing the light receiving device 11 can be performed by one action with ease.

Moreover, in the hybrid optical/electric connector 1 of the embodiment, the second connector housing 4 disposed with the electric terminals 5 is formed of a non-conductive resin. Therefore, the electric terminals 5 will not be electrically coupled to the second connector housing 4. The wires 28 inserted and fixed to the plug connector 2 are inserted into the second connector housing 4, and the wires 28 can be electrically coupled to an electric circuit.

Besides, in the hybrid optical/electric connector 1 of the embodiment, the second optical device accommodating part 42 is disposed in the second connector housing 4 to shorten the distance between the light emitting face of the light emitting device 10 accommodated in the second optical device accommodating part 42 and the optical fiber 12 inserted into the plug connector fitting part 31. Thus, the hybrid optical/electric connector 1 of the embodiment can reduce the coupling loss of the light emitting device 10 to the optical fiber 12.

Furthermore, the hybrid optical/electric connector 1 of the embodiment has the configuration where the lens 26 is disposed on the light emitting device 10 side and the light made to have an incident numerical aperture smaller than the numerical aperture of the optical fiber 12 by the lens 26 is incident into the optical fiber 12. This configuration allows an appropriate refraction angle of light in propagating through the optical fiber 12. It can reduce splice losses in joining the optical fiber 12 to another optical fiber, and it can also decrease transmission attenuation due to a bend of the optical fiber 12.

On this account, in the hybrid optical/electric connector 1 of the embodiment, a bending loss does not become greater even when a bend is generated in the optical fiber 12 to be inserted into the hybrid optical/electric connector 1, and a greater optical attenuation is not generated even when some misalignment occurs in joining the optical fiber 12 to another optical fiber. The inventor has demonstrated this by experiment.

In addition, the inventor considered that a lens is also disposed on the light receiving device 11, whereby a suppressed bending loss of the optical fiber 13 is to be realized. However, in this case, when the diameter of the lens is set equal to that of the optical coupling intermediate optical fiber 27, the coupling loss of the light receiving device 11 to the optical fiber 13 becomes greater than the case of providing the optical coupling intermediate optical fiber 27. Also, when the lens diameter is set greater, it causes the hybrid optical/electric connector to be larger. Therefore, preferably, the optical coupling intermediate optical fiber 27 is provided on the light receiving device 11 to realize reduction in the coupling loss of the light receiving device 11 to the optical fiber 13 and a small-sized hybrid optical/electric connector 1.

Furthermore, in the hybrid optical/electric connector 1 of the embodiment, the first connector housing 3 and the second connector housing 4 are detachably disposed. On this account, a second connector housing 4 can be given electric terminals 5 in a number corresponding to the number of the wires 28 of the plug connector 2 for the connection, and also the second connector housing 4 may be replaced as necessary.

Moreover, in the hybrid optical/electric connector 1 of the embodiment, the first connector housing 3 and the second connector housing 4 are detachable as described above. On this account, the work to mount the electric terminals 5 in the second connector housing 4 is also easy, and the fabrication of the hybrid optical/electric connector 1 can be facilitated as well.

Besides, in the hybrid optical/electric connector 1 of the embodiment, the faces 17 (17a and 17b) of the metal case 6 on the optical device fixing side are disposed with the spring mechanisms for pressing on the light emitting device 10 and the light receiving device 11 to the second connector housing 4 side, respectively. These spring mechanisms can absorb errors even when there are errors due to the sizes between the light receiving device 11 and the first optical device accommodating part 41 and between the light emitting device 10 and the second optical device accommodating part 42. Thus, the hybrid optical/electric connector 1 of the embodiment can accurately fix the light receiving device 11 to the first optical device accommodating part 41 and the light emitting device 10 to the second optical device accommodating part 42.

That is, in the hybrid optical/electric connector 1 of the embodiment, the dimensions of the light receiving device 11 to the first and second optical device accommodating part 41 and the dimensions of the light emitting device 10 to the second optical device accommodating part 42 do not need to be formed extremely accurately, which allows a more inexpensive hybrid optical/electric connector 1.

Additionally, for the spring mechanisms, into the faces 17 (17a and 17b) of the metal case 6 on the optical device fixing side the U-shaped slits 18 are cut and the projecting parts 19 project from the face abutting against the light emitting device 10 and the light receiving device 11. That is, in the spring mechanisms, elastic bodies such as a coil spring are not disposed separately from the metal case 6. Thus, the parts forming the hybrid optical/electric connector 1 does not become more numerous, and the light emitting device 10 and the light receiving device 11 can be fixed extremely easily.

Furthermore, the hybrid optical/electric connector 1 of the embodiment is formed with the light emitting device 10 and the light receiving device 11. On this account, the plug connector 2 is fit to the hybrid optical/electric connector 1 of the embodiment, whereby the light emitting device 10 and the light receiving device 11 can be optically coupled to the optical fibers 12 and 13 in the block with one action, and the reduction in the parts count of the connector can be realized as well as the simplification of the work to join the connector.

Moreover, the invention is not limited to the embodiment, but can adopt various forms. For example, in the embodiment, four electric terminals 5 were provided on the second connector housing 4 side, but the number of the electric terminals 5 provided is not defined particularly; it can be set appropriately. The number of the electric terminals 5 provided is such as eight, twelve, and twenty four; it can correspond to the number of the wires 28 provided in the plug connector 2 to be the connection counterpart.

Besides, in the embodiment, the U-shaped slits 18 were disposed in the faces 17 on the optical device fixing side as the spring mechanisms of the metal case 6. However, the slits may have a shape other than the U-shape; it may be a rectangular U-shape slit or C-shape slit. Also, other than forming the slits, the spring mechanisms may have the configuration where at least a part of the faces 17 on the optical device fixing side falls toward the optical device such as the light emitting device 10 or light receiving device 11.

In addition, in the embodiment, a plurality of bumps 16 was disposed on the metal case 6, but the number of the bumps disposed or the forms of the bumps are not defined particularly, which can be set properly. Also, the bumps 16 can be omitted. However, in the configuration of disposing the bumps 16, the first connector housing 3 can be conducted surely by one action when the metal case 6 is mounted on the first connector housing 3.

Furthermore, in the embodiment, the metal case 6 was formed of brass, but the materials for forming the metal case 6 are not defined particularly, which can be set properly. For example, the metal case 6 may be formed of stainless metal.

Moreover, in the embodiment, the first connector housing 3 was formed of PBT with carbon filler and the second connector housing 4 was formed of PBT with glass filler. However, the materials for forming the first connector housing 3 and the second connector housing 4 are not defined particularly, which can be set properly. For example, the first connector housing 3 is formed of a conductive resin and the second connector housing 4 is formed of a non-conductive resin, whereby almost the same effect as the embodiment can be exerted.

Besides, in the embodiment, the first connector housing 3 and the second connector housing 4 were detachably formed, but the first connector housing 3 and the second connector housing 4 are not necessarily detachable. For example, a joined body of the first connector housing 3 and the second connector housing 4 may be formed by integral molding. However, when the first connector housing 3 and the second connector housing 4 are separately formed to be detachable as the embodiment, the fabrication of the hybrid optical/electric connector 1 can be facilitated.

Additionally, in the embodiment, a pair of the light emitting device 10 and the light receiving device 11 arranged side by side was accommodated, but the connector of the invention may accommodate only the light emitting device 10 or only light receiving device 11. That is, in the invention, the number of the light emitting device 10 or light receiving device 11 provided need not be defined particularly, but can be set appropriately. The connector of the invention may have two or more optical device accommodating parts.

Furthermore, the dimensions of the connector of the invention are not defined to the size shown in the embodiment, but can be set properly.

Moreover, the connector of the invention is not limited to the hybrid optical/electric connector as the embodiment, but can be adapted to an optical connector without electric terminals. Also in this case, among optical device accommodating parts, at least those which are adjacent to each other are arranged side by side with their positions displaced relative to each other in the longitudinal direction of the optical fibers inserted into the insertion part for the optical fibers, whereby the electrical crosstalk between the optical devices can be suppressed.

Besides, in the embodiment, the connector of the invention has been described for use in optical communications in vehicles. However, the connector of the invention can be adapted to various purposes in optical communications such as FA (Factory Automation), a home LAN, audio and PCs.

In addition, in the embodiment, the optical fibers inserted into the connector were set to be a plastic optical fiber, but a glass optical fiber may be used; any types of optical fibers are acceptable.

What is claimed is:

1. A connector comprising:

two or more optical device accommodating parts for accommodating optical devices; and an optical connector housing provided with an insertion part configured to receive a plug comprising two or more optical fibers and to couple the two or more optical fibers to the two or more optical devices, wherein among optical device accommodating parts, each accommodating part having a positions displaced relative to each adjacent accommodating part such that each of the optical device accommodating parts in non-overlapping with each adjacent accommodating part in the longitudinal direction of the optical fibers inserted into the insertion parts for optical fibers.

2. The connector according to claim 1,
wherein the connector housing is provided with electric terminals,
a first optical device accommodating part is disposed at a first position, and
a second optical device accommodating part adjacent to the first optical device accommodating part is disposed at a second position, wherein the second position is more forward than the first position of the first optical device accommodating part.

3. The connector according to claim 2,
wherein the connector housing has at least a first connector housing having the first optical device accommodating part and a second connector housing disposed with the electric terminals, and
the first connector housing is formed of a conductive resin and the second connector housing is formed of a non-conductive resin.

4. The connector according to claim 2,
wherein a light receiving device is accommodated in the first optical device accommodating part, and
a light emitting device is accommodated in the second optical device accommodating part.

5. The connector according to claim 4,
wherein an optical coupling intermediated optical fiber for mediating coupling of an optical fiber inserted into the connector housing to the light receiving side of the light receiving device, and
a lens causing light emitted from a light emitting device to enter an optical fiber inserted into the connector housing on the light emitting side of the light emitting device.

6. The connector according to claim 5,
wherein the light emitting device has an incident numerical aperture greater than the optical fiber inserted into the connector housing, and
the lens is formed to be a condensing lens for condensing light emitted from the light emitting device so as to allow the light to have an incident numerical aperture smaller than a numerical aperture of the optical fiber and thus causing the light to enter the optical fiber.

7. The connector according to claim 4, wherein the light receiving device is a photodiode (PD), and the light emitting device is a light emitting diode (LED).

8. The connector according to claim 3, wherein the first connector housing and the second connector housing are detachably formed.

9. The connector according to claim 1, wherein a metal case is provided for fixing the optical devices accommodated in the optical device accommodating parts.

10. The connector according to claim 9, wherein a spring mechanism for pressing the optical devices to the optical fiber insertion part is disposed on the faces of the metal case on which optical devices are fixed.

* * * * *